(12) United States Patent
Fujii et al.

(10) Patent No.: US 7,614,977 B2
(45) Date of Patent: Nov. 10, 2009

(54) VEHICLE POWER TRAIN CONTROL APPARATUS

(75) Inventors: Takeshi Fujii, Setagaya-ku (JP); Keizo Ishida, Hiratsuka (JP); Kenichiro Murakami, Atsugi (JP); Yoshinori Yamamoto, Utsunomiya (JP)

(73) Assignee: Nissan Motor Co., Ltd., Yokohama (JP)

( * ) Notice: Subject to any disclaimer, the term of this patent is extended or adjusted under 35 U.S.C. 154(b) by 410 days.

(21) Appl. No.: 11/680,812

(22) Filed: Mar. 1, 2007

(65) Prior Publication Data

US 2007/0213176 A1    Sep. 13, 2007

(30) Foreign Application Priority Data

Mar. 7, 2006   (JP)   ............................ 2006-060816
Nov. 30, 2006  (JP)   ............................ 2006-323620

(51) Int. Cl.
   *B60W 10/04*   (2006.01)
(52) U.S. Cl. ...................................... 477/107; 477/110
(58) Field of Classification Search ................ 477/107, 477/110, 904, 905
   See application file for complete search history.

(56) References Cited

U.S. PATENT DOCUMENTS 6,702,718 B2 * 3/2004 Tani et al. ................... 477/203
6,754,579 B2 * 6/2004 Kamiya et al. .............. 701/112
2003/0054919 A1 * 3/2003 Matsubara et al. ............ 477/4

FOREIGN PATENT DOCUMENTS

| JP | 05-065037 | 3/1993 |
| JP | 05-124460 | 5/1993 |
| JP | 06-144085 | 5/1994 |
| JP | 07-243516 | 9/1995 |
| JP | 07-280076 | 10/1995 |
| JP | 2000179362 A * | 6/2000 |
| JP | 2000310138 A * | 11/2000 |

* cited by examiner

Primary Examiner—Ha D. Ho
(74) Attorney, Agent, or Firm—Global IP Counselors, LLP

(57) ABSTRACT

A vehicle power train control apparatus is provided that basically comprises an output characteristics changing section, an operation mode determining section and a control section. The output characteristics changing section changes engine output characteristics of a vehicle with respect to an operation of an accelerator pedal. The operation mode determining section determines an operation mode of the vehicle among a plurality of operation modes including at least a reacceleration response mode based on driving information of the vehicle. The control section controls the output characteristics changing section to change the engine output characteristics under a reduced accelerator position state during the reacceleration response mode to increase a driving force upon reacceleration of the vehicle when an accelerator position is increased after the vehicle was decelerated.

10 Claims, 8 Drawing Sheets

VEHICLE POWER TRAIN CONTROL APPARATUS

CROSS-REFERENCE TO RELATED APPLICATIONS

This application claims priority to Japanese Patent Application Nos. 2006-060816, filed on Mar. 7, 2006 and 2006-323620, filed on Nov. 30, 2006. The entire disclosures of Japanese Patent Application Nos. 2006-060816 and 2006-323620 are hereby incorporated herein by reference.

BACKGROUND OF THE INVENTION

1. Field of the Invention

The present invention relates to a vehicle power train control apparatus. More specifically, the present invention relates to a vehicle power train control apparatus configured and arranged to control a vehicle power train so that an operation of the vehicle power train matches an operation mode of the vehicle determined based on vehicle driving information.

2. Background Information

A conventional automatic transmission, including a continuously variable transmission, is configured and arranged to determine a target transmission input rotation rate and a target gear according to a speed of a vehicle as well as an accelerator position and a throttle position that are indicative of an engine load by referring to a predetermined map. The conventional automatic transmission is then configured and arranged to shift gears so that the transmission input rotation rate and a selected gear are switched to the target transmission input rotation rate and the target gear, respectively.

In such conventional automatic transmission, the control over the shifting of gears is unambiguously determined by the predetermined map. Therefore, it is impossible to control the shifting of the gears in a manner that is suited to all driving tendencies, which vary widely in accordance with road conditions and driver's personal preferences. For example, when a swift and fast-paced type of travel is desired, a low gear ratio is preferably used. Also, when travelling a continuously winding road such as a mountain road, maintaining a low gear ratio is preferred over frequent and repeated shifting of gears.

Therefore, Japanese laid-Open Patent Application Publication No. 07-280076 and Japanese Laid-Open Patent Application Publication No. 07-243516 disclose a method for controlling gear changes in an automatic transmission in which data relating the vehicle operation is analyzed to determine the driving tendency. The data relating the vehicle operation includes accelerator position, rate of change in the accelerator position, vehicle speed, front to rear acceleration of a vehicle body, braking operation, steering angle, lateral acceleration toward the vehicle body, yaw rate toward the vehicle body, navigational (GPS) information, and the like. Then, the driving force is controlled in accordance with the driving tendency that is determined based on the vehicle operation information.

According to such conventional method for controlling the shifting of gears as disclosed in the above mentioned references, even during a high-speed travel with a low accelerator position in which the vehicle is usually upshifted into a higher gear, it is possible to maintain a lower gear ratio or downshift to a lower gear ratio if the driving tendency indicates reacceleration of the vehicle will be required. Thus, the desired acceleration performance can be achieved when the acceleration position is subsequently raised to reaccelerate the vehicle. The sufficient reacceleration performance required by the driver can accordingly be provided.

Moreover, the driving tendency is determined such that reacceleration of the vehicle will be required, for example, when traveling on a continuously winding road such as a mountain road. In the conventional method for controlling the shifting of gears as disclosed in the above mentioned references, the gear shift control is changed in accordance with this driving tendency so that a relatively low gear ratio will be maintained. As a result, it is possible to avoid repeated upshifting caused by the driver releasing his/her foot from the accelerator pedal when approaching a curve (corner or bend) in a road, and repeated downshifting caused by reacceleration when the driver depresses the accelerator pedal on coming out of the curve. By controlling the shifting of gears according to the driving tendency, the driver can navigate the winding road in a swift manner with the low gear ratio being maintained.

In view of the above, it will be apparent to those skilled in the art from this disclosure that there exists a need for an improved vehicle power train control apparatus. This invention addresses this need in the art as well as other needs, which will become apparent to those skilled in the art from this disclosure.

SUMMARY OF THE INVENTION

In the conventional method for controlling the shifting of gears of the automatic transmission as disclosed in the above mentioned references, when the control is only performed on the shifting of gears of the automatic transmission in accordance with the driving tendency, the following problem arises. Even if the operation of the automatic transmission is changed to control the shifting of gears in response to the driving tendency requiring reacceleration, the engine will exhibit output characteristics corresponding to a reduced accelerator position. Therefore, the response delay in the output of the engine when the accelerator is once again depressed from a reduced state to reaccelerate the vehicle becomes large. Thus, driving force outputted from the engine will be inadequate during the reacceleration of the vehicle. As a result, a problem of increased response delay arises during reacceleration after the vehicle has decelerated.

Accordingly, one object of the present invention is to provide a vehicle power train control apparatus that can change the engine output characteristics while the driving tendency indicates that reacceleration of the vehicle will be required.

In order to achieve the above object of the present invention, a vehicle power train control apparatus is provided that basically comprises an output characteristics changing section, an operation mode determining section and a control section. The output characteristics changing section is configured and arranged to change engine output characteristics of a vehicle with respect to an operation of an accelerator pedal. The operation mode determining section is configured to determine an operation mode of the vehicle among a plurality of operation modes including at least a reacceleration response mode based on driving information of the vehicle. The control section is configured to control the output characteristics changing section to change the engine output characteristics under a reduced accelerator position state during the reacceleration response mode to increase a driving force upon reacceleration of the vehicle when an accelerator position is increased after the vehicle was decelerated.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
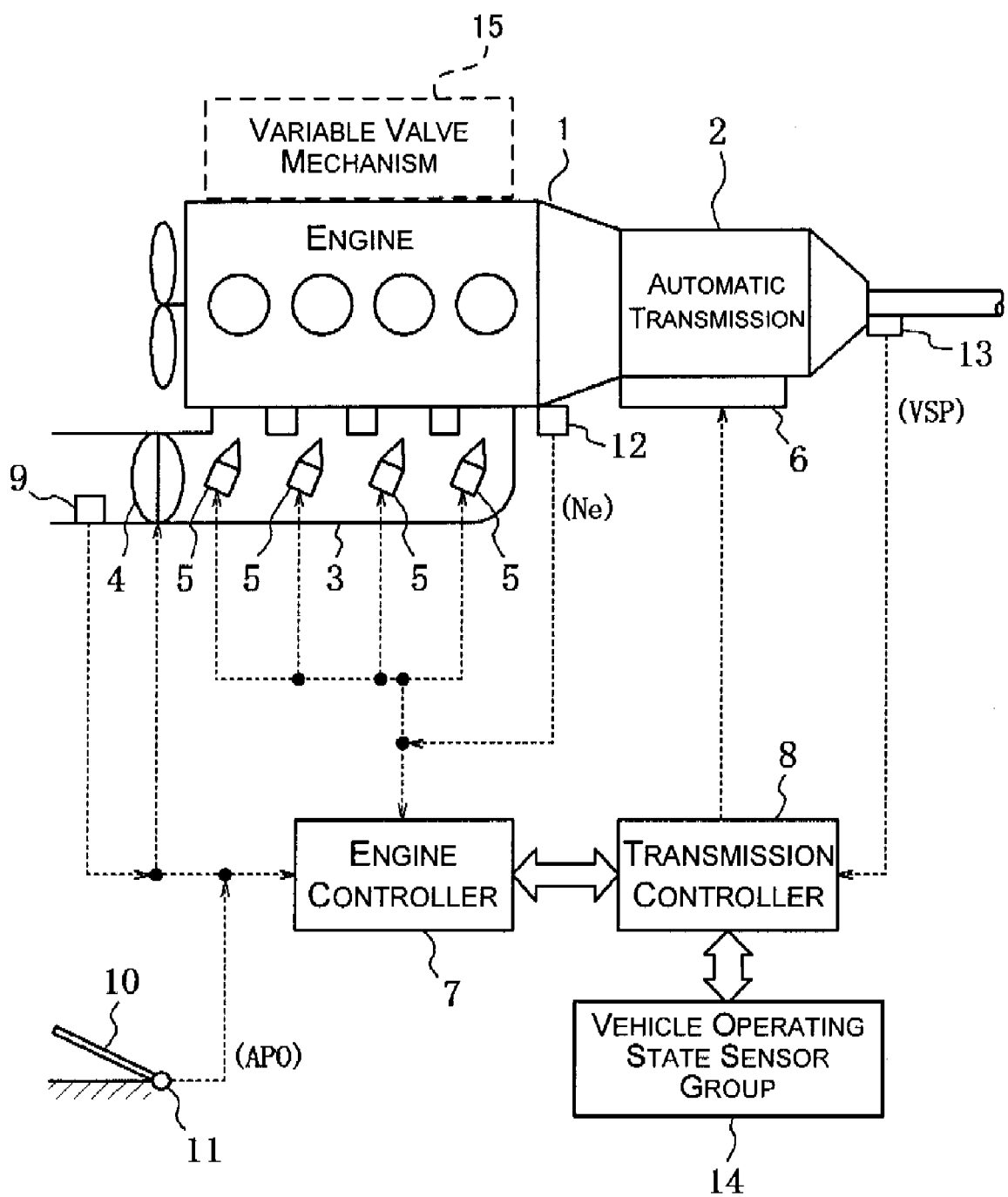
FIG. 1 is a schematic system diagram of a vehicle power train system provided with a vehicle power train control apparatus in accordance with a first embodiment of the present invention.

Referring initially to FIG. 1, a vehicle power train control apparatus is illustrated in accordance with a first embodiment of the present invention. FIG. 1 is a schematic system diagram of a vehicle power train system provided with the vehicle power train control apparatus in accordance with the first embodiment. As shown in FIG. 1, the vehicle power train system includes an engine 1, an automatic transmission 2, an intake pipe 3, a throttle valve 4, a plurality of fuel injection valves 5, a control valve body 6, an engine controller 7, a transmission controller 8, a throttle position sensor 9, an accelerator pedal 10, an accelerator position sensor 11, an engine rotation sensor 12, a vehicle speed sensor 13 and a vehicle operating state sensor group 14 including a plurality of vehicle sensors. The engine 1 can be provided with a variable valve mechanism 15 that is configured and arranged to change an output of the engine 1 by controlling a lift amount and an opening/closing timing of at least one of an intake valve (not shown) and an exhaust valve (not shown) of the engine 1.

The engine 1 includes the fuel injection valves 5, each of which is provided for each cylinder. The throttle valve 4 is disposed within the intake pipe 3 such that the amount of air taken into the engine 1 is determined by controlling the opening amount of the throttle valve 4. The amount of fuel that is injected is determined by controlling the opening amount of the fuel injection valve 5 in conjunction with the air intake amount. The air-fuel mixture is ignited by a spark plug (not shown) to drive the engine 1. The engine 1 of the first embodiment preferably includes a fuel cutoff apparatus (e.g., the engine controller 7) configured and arranged to selectively stop supplying of the fuel into the cylinders under prescribed fuel cutoff conditions.

The automatic transmission 2 includes the control valve body 6. The control valve body 6 incorporates a gear shift control circuit configured to determine a selected gear (in a stepped automatic transmission) or a selected gear ratio (in a continuously variable automatic transmission). The rotation produced by the engine 1 is shifted in accordance with the gear or the gear ratio of the automatic transmission 2, and then transmitted to a plurality of driving wheels (not shown) of the vehicle.

The engine controller 7 is configured to control operation of the engine 1 by controlling the throttle valve 4, the fuel injection valves 5, and the spark plugs (not shown). The engine controller 7 preferably includes a microcomputer with an engine output characteristics change control program that controls the engine output characteristics as discussed below. The engine controller 7 can also include other conventional components such as an input interface circuit, an output interface circuit, and storage devices such as a ROM (Read Only Memory) device and a RAM (Random Access Memory) device. The microcomputer of the engine controller 7 is programmed to control the throttle valve 4, the fuel injection valves 5, and the spark plugs of the engine 1. The memory circuit stores processing results and control programs that are run by the processor circuit. The engine controller 7 is operatively coupled to the throttle valve 4, the fuel injection valves 5, the spark plugs and other various components of the vehicle in a conventional manner. The internal RAM of the engine controller 7 stores statuses of operational flags and various control data. The internal ROM of the engine controller 7 stores data for various operations. The engine controller 7 is capable of selectively controlling any of the components of the control system in accordance with the control program. It will be apparent to those skilled in the art from this disclosure that the precise structure and algorithms for the engine controller 7 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The transmission controller 8 is configured to control the shifting of gears in the automatic transmission 2 by controlling the control valve body 6. The transmission controller 8 can be arranged as a separate control unit from the engine controller 7 having a separate microcomputer and other conventional components such as an input interface circuit, an output interface circuit, and storage devices such as a ROM (Read Only Memory) device and a RAM (Random Access Memory) device. Alternatively, the transmission controller 8 can be arranged as an integral control circuit as the engine controller 7.

The throttle position sensor 9 is configured and arranged to detect a throttle position TVO of the throttle vale, and to output a signal indicative of the throttle position TVO. The accelerator position sensor 11 is configured and arranged to detect an amount by which the accelerator pedal 10 has been depressed (accelerator position APO), and to output a signal indicative of the accelerator position APO. The accelerator position APO represents an engine output value requested by the driver. The engine rotation sensor 12 is configured and arranged to detect a rotational speed Ne of the engine 1, and to output a signal indicative of the rotational speed Ne. The vehicle speed sensor 13 is configured and arranged to detect a vehicle speed VSP, and to output a signal indicative of the vehicle speed VSP. The vehicle sensors of the vehicle operating state sensor group 14 are configured and arranged to detect data related to the operating state of the vehicle, such as a front to rear acceleration (deceleration) Gx of the vehicle body, braking operations, steering angle, lateral acceleration Gy of the vehicle body, yaw rate $\phi$, and navigational (GPS) information. The data related to the operating state of the vehicle detected by the vehicle operating state sensor group 14 is used to determine a driving operation mode of the vehicle.

The engine controller 7 and the transmission controller 8 are configured to share input information and calculation results. The input information includes signals outputted from the throttle position sensor 9, the accelerator position sensor 11, the engine rotation sensor 12, the vehicle speed sensor 13 and the vehicle operating state sensor group 14.

In the gear shift control in the automatic transmission 2, the transmission controller 8 is configured to determine a target gear and a target transmission input rotational speed that are appropriate for the operating state based on the accelerator position APO and the throttle position TVO, which represent the engine load, and based on the vehicle speed VSP, by referring to a predetermined gear shifting map. Then, the transmission controller 8 is configured to shift the gears of the automatic transmission 2 by controlling the control valve body 6 so that the selected gear and the selected transmission input rotational speed are changed to the target gear and the target input rotational speed that have been determined.

Thus, the transmission controller 8 is configured to perform normal gear control as described above. In addition, the transmission controller 8 is preferably configured to analyze the accelerator position APO, the rate of change in the accelerator position APO, the vehicle speed VSP, the front to rear acceleration (deceleration) Gx of the vehicle body, the braking operations, the steering angle, the lateral acceleration Gy of the vehicle body, the yaw rate $\phi$, the navigational (GPS) information, and other data relating to the operational state of the vehicle, and to determine the driving operation mode (e.g., a reacceleration response mode, a normal operation mode, a fuel economy mode, etc.). Then, the transmission controller 8 is configured to transmit the result (determined driving operation mode) to the engine controller 7. Moreover, the transmission controller 8 is configured to set the gear shift control characteristics of the automatic transmission 2 to be different from the above-described normal transmission control characteristics so that the driving force characteristics correspond to the driving operation mode that has been determined.

In such gear shift control that adapts to the driving operation mode, even if the vehicle is traveling at a high speed and the accelerator position is low (in which upshifting to a high gear ratio is normally performed), it is possible to change the gear shift control characteristics to maintain a relatively low gear ratio or to downshift to the relatively low gear ratio when it is determined that the driving operation mode is in the reacceleration response mode (e.g., the vehicle operating information indicates that the reacceleration of the vehicle will be required). Thus, a satisfactory acceleration performance can be obtained when the accelerator position is subsequently increased to reaccelerate the vehicle after the vehicle has decelerated. Accordingly, the demands of the driver who desires quick reacceleration can be addressed by controlling the gear shift control characteristics during the reacceleration response mode.

For example, the transmission controller 8 is configured to determine that the driving operation mode is in the reacceleration response mode when traveling on a continuously winding road such as a mountain road. In such case, the transmission controller 8 is configured to change the gear shift control characteristics in accordance with the driving operation mode (i.e., the reacceleration response mode) so that a relatively low gear ratio is maintained. As a result, it is possible to avoid repeated upshifting caused by the driver releasing his/her foot from the accelerator pedal 10 when approaching a curve, and repeated downshifting caused by reacceleration when the driver depresses the accelerator pedal 10 on coming out of the curve. Accordingly, the driver can navigate the winding road in a swift manner with the relatively low gear ratio being maintained.

However, when only the gear shift characteristics of the automatic transmission 2 is controlled in accordance with the driving operation mode, a problem of increased response delay in the engine output can arise during reacceleration after the vehicle has decelerated as mentioned above. Therefore, in the vehicle power train control apparatus of the present invention, the engine controller 7 is configured to receive information relating to the driving operation mode, and to perform the engine output characteristic change control (step S9 of FIG. 2) according to the driving operation mode.

Figure 2:
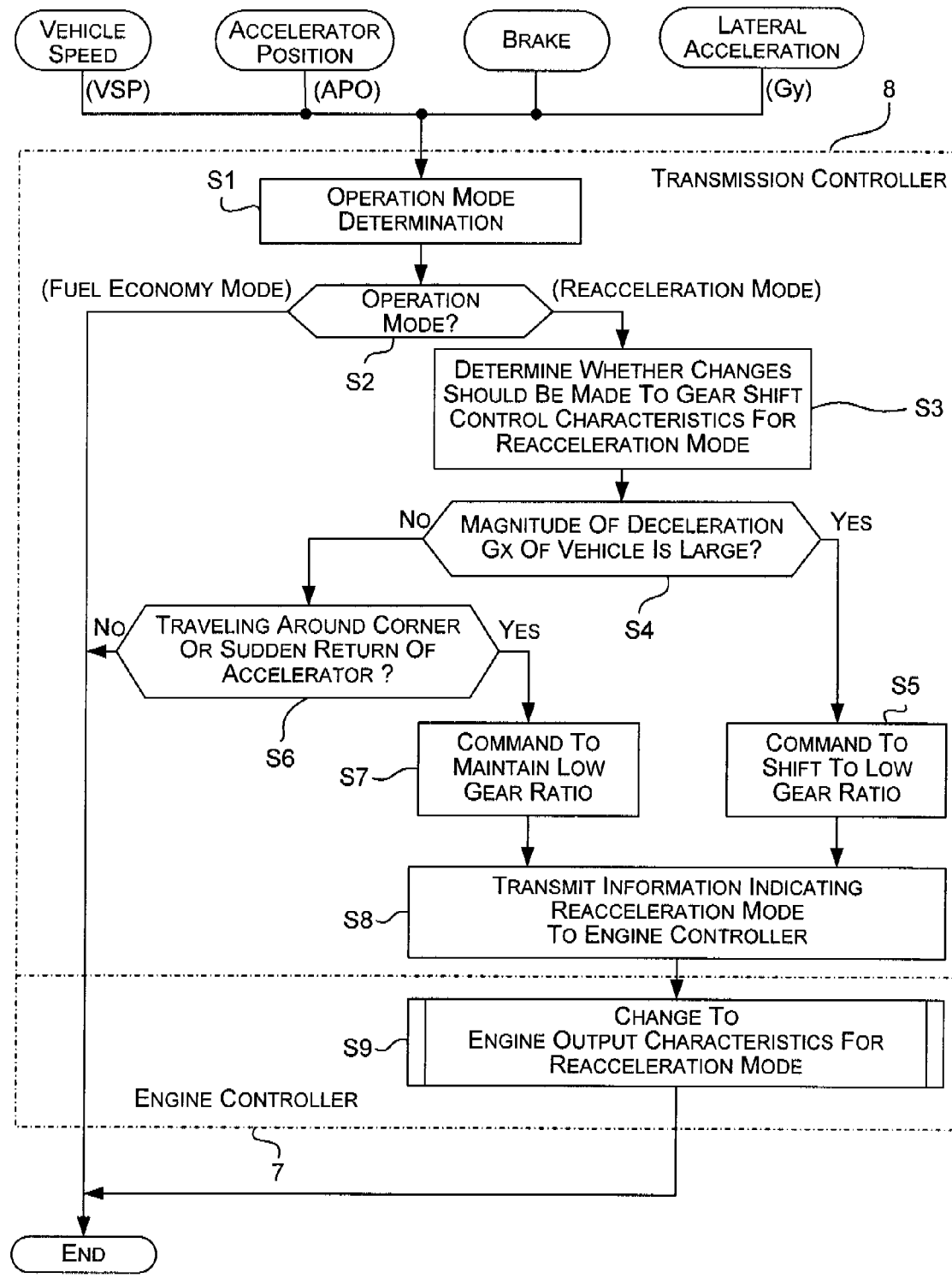
FIG. 2 is a flowchart illustrating a control process executed in the vehicle power train control apparatus to control the vehicle power train system illustrated in FIG. 1 in accordance with the first embodiment of the present invention.

Referring now to FIG. 2, the control process executed by the transmission controller 8 will be explained first in more detail.

In step S1, the transmission controller 8 is configured to analyze the vehicle speed VSP, the accelerator position APO, a brake operating state, the lateral acceleration Gy, and other vehicle operating information data. Then, the transmission controller 8 is configured to determine the driving operation mode based on the analyzed data and the travel history of the driver. More specifically, in analyzing the operating information data, the transmission controller 8 is configured to acquire the degree to which the accelerator pedal 10 and a brake pedal (not shown) are depressed and released during a prescribed period of travel (e.g., thirty seconds) based on the accelerator position APO and the brake operating state (i.e., acquiring data relating to the degree of acceleration and deceleration of the vehicle). Moreover, the transmission controller 8 is configured to obtain information on whether the vehicle is traveling around a curve based on the lateral acceleration Gy. Furthermore, the transmission controller 8 is configured to acquire data concerning the vehicle speed VSP while traveling around the curve. The transmission controller 8 is configured to determine the driving operation mode based on the amount of acceleration and deceleration of the vehicle and the vehicle speed VSP at which the vehicle travels around curves. The transmission controller 8 is configured to determine the driving operation mode is in the reacceleration response mode when the amount of acceleration and deceleration is a relatively large value (e.g., equal to or greater than a predetermined value), and when the vehicle speed VSP at which the vehicle travels through a curve in a road is a relatively high value (e.g., equal to or greater than a predetermined vehicle speed). On the other hand, the transmission controller 8 is configured to determine that the driving operation mode is in the fuel economy mode when the amount of acceleration and deceleration is lower than the predetermined value and the vehicle speed VSP at which the vehicle travels through a curve is lower than the predetermined vehicle speed.

In step S2, the transmission controller 8 is configured to detect whether the driving operation mode determined in step S2 is the reacceleration response mode or the fuel economy mode. If the transmission controller 8 determines that the operation mode is in the reacceleration response mode, then the transmission controller 8 proceeds to step S3.

In steps following step S3, the transmission controller 8 is configured to determine whether or not the gear shift control characteristics should be changed to the characteristics corresponding to the reacceleration response mode.

First, in step S4, the transmission controller 8 is configured to determine whether the deceleration Gx (deceleration rate) of the vehicle is large (e.g., equal to or greater than a prescribed value). The determination in step S4 is performed in order to prepare for reacceleration of the vehicle upon depression of the accelerator pedal 10 after the vehicle has decelerated. For example, when driving on a mountain road or other continuously winding road, the driver decelerates the vehicle when approaching a curve, and a good responsiveness is required when the vehicle reaccelerates upon depression of the accelerator pedal 10 after the vehicle passes the curve. Since the driver depresses the brake pedal when entering the curve, the deceleration Gx of the vehicle is a large value (e.g., equal to or greater than the preset value). When the deceleration Gx of the vehicle is determined to be high in step S4 (Yes in step S4), the transmission controller 8 is configured to output a command for changing to a low gear ratio to the control valve body 6 in step S5. The process executed in step S5 corresponds to the gear shift control characteristics changing section of the present invention. Then, in step S8, the transmission controller 8 is configured to transmit information indicating that the driving operation mode is in the reacceleration response mode to the engine controller 7. In step S9, the engine controller 7 is configured to control the engine output characteristics as described in more detail below. It is accordingly possible to increase the reacceleration responsiveness from a low speed used when nearing a curve upon the accelerator pedal 10 being depressed after the vehicle passes the curve.

On the other hand, when the deceleration Gx of the vehicle is low in step S4 (No in step S4), the transmission controller 8 is configured to determine whether the vehicle is traveling around a curve or the accelerator pedal 10 has been suddenly returned (the accelerator position APO has been suddenly reduced) in step S6. More specifically, the transmission controller 8 is configured to determine that the accelerator pedal 10 has been suddenly returned when the rate at which the accelerator position APO is reduced is equal to or greater than a prescribed rate. When it is determined that the vehicle is traveling around a curve or that the accelerator position APO has suddenly been reduced in step S6 (Yes in step S6), the transmission controller 8 is configured to output a command to maintain the low gear ratio to the control valve body 6 in step S7. The control executed in step S7 corresponds to the gear shift control characteristics changing section of the present invention. Moreover, shifting to a low gear ratio in step S5 and maintaining the low gear ratio in step S7 during the reacceleration response mode than during the normal operation mode correspond to a low gear ratio characteristic being selected in the present invention.

Then, in step S8, the transmission controller 8 is configured to transmit information indicating that the driving operation mode is in the reacceleration response mode to the engine controller 7. In step S9, the engine controller 7 is configured to control the engine output characteristics as described in more detail below.

Accordingly, the driver's intent to perform a quick reacceleration can be addressed during the reacceleration response mode. Since the low gear ratio is maintained when traveling a continuously winding road, it is possible to avoid repeated upshifting caused by the driver releasing his/her foot from the accelerator pedal 10 when approaching a curve, and repeated downshifting caused by reacceleration when the driver depresses the accelerator pedal 10 on coming out of the curve. Thus, the driver can travel the continuously winding road in a swift manner with the low gear ratio being maintained.

However, when the transmission controller 8 determines that the driving operation mode is in the fuel economy mode in step S2, or when the transmission controller 8 determines that the vehicle is not traveling around a curve and that the accelerator position APO has not suddenly been reduced in step S6, then the transmission controller 8 is configured to end this control cycle without executing further control processing (e.g., without further modifications). In such case, the reacceleration response mode control is not performed, and the normal operation mode control based on the gear map is performed.

After the transmission controller 8 executes the control processing in step S5 or S7, then information indicating that the driving operation mode is in the reacceleration response mode is transmitted from the transmission controller 8 to the engine controller 7 in step S8.

When the engine controller 7 receives the information indicating that the driving operation mode is in the reacceleration response mode, the engine controller 7 is configured to control the engine output characteristics to correspond to the characteristics for the reacceleration response mode in step S9 as described below. More specifically, the engine controller 7 is configured to change the engine output characteristics during the reacceleration response mode with the reduced accelerator position state, which remains in effect until the accelerator position is raised, to increase the driving force during reacceleration upon the accelerator position APO being increased. Therefore, the control executed by the engine controller 7 in step S9 corresponds to the engine output characteristics change control in the reacceleration response mode of the present invention.

The engine output characteristics change control executed by the engine controller 7 during the reacceleration response mode in step S9 of FIG. 2 will be described in more detail.

As mentioned above, the engine 1 of the first embodiment is preferably provided with the fuel cutoff apparatus. The fuel cutoff apparatus has been used in most of the recent engines to conserve fuel. The fuel cutoff apparatus is configured and arranged to interrupt the supply of fuel to the engine 1 when the accelerator position APO is almost fully closed, which indicates that output from the engine 1 is not necessary.

In the fuel cutoff apparatus, when the interrupting of the fuel supply is continued until the rotational speed of the engine 1 falls below a certain rotational speed, the engine 1 will no longer be able to operate in a self-sustained manner even when the supply of fuel is recovered (i.e., the supply of fuel is restarted). Therefore, the fuel cutoff apparatus is configured and arranged to recover the fuel supply if the engine rotational speed decreases to a prescribed speed even if the accelerator position APO remains in a reduced state.

Figure 5:
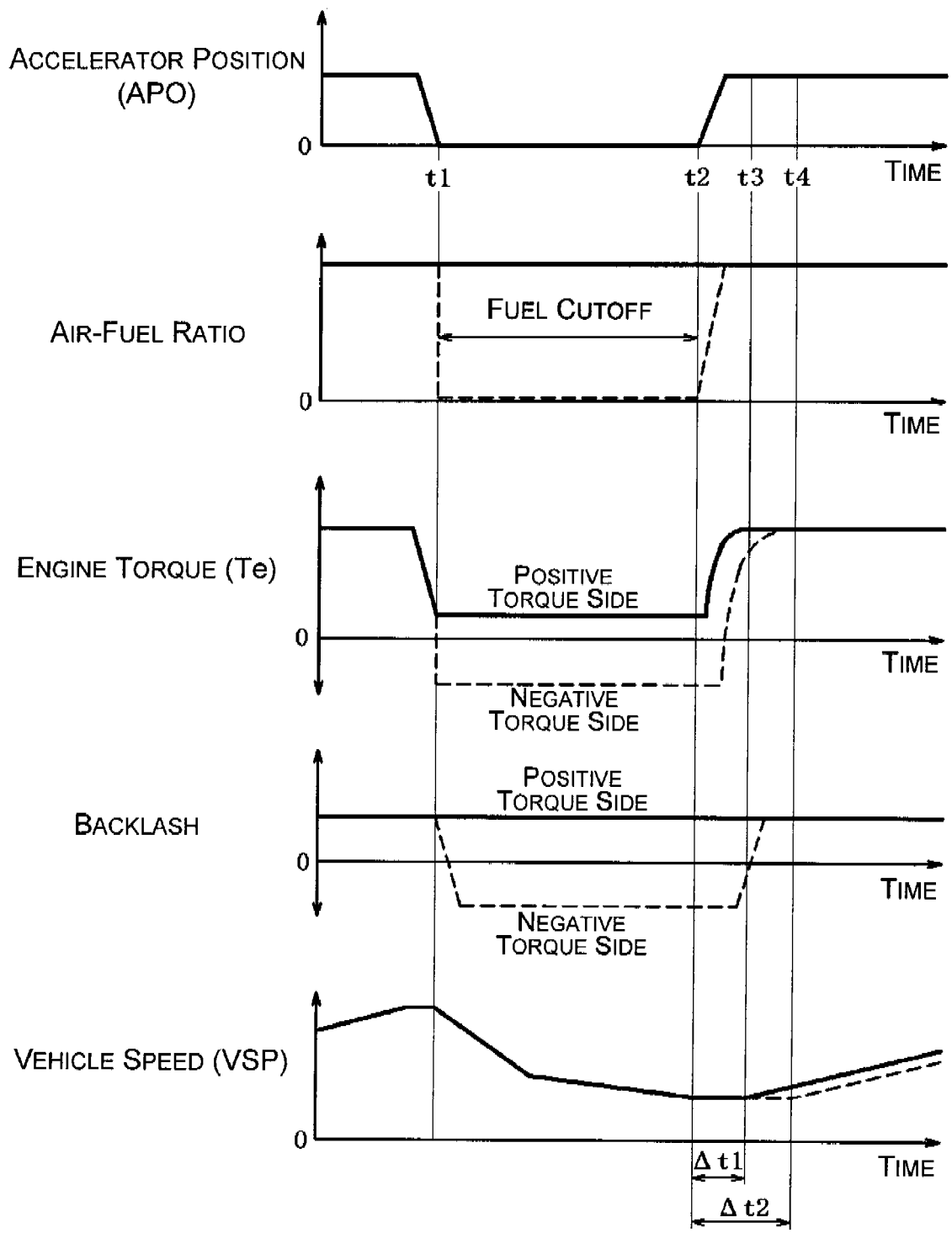
FIG. 5 is a simplified operation time chart showing a comparison between an operation of the vehicle when the engine output characteristics change control is performed during the reacceleration response mode as shown in FIG. 3 and an operation of the vehicle when the engine output characteristics change control is not performed.

In the vehicle power train system including the engine 1 equipped with the fuel cutoff apparatus, when only the gear shift characteristics of the automatic transmission 2 is controlled in accordance to the driving operation mode (the reacceleration response mode), and the engine output characteristics (the fuel cutoff control) is not changed, the following problem arises. FIG. 5 is a simplified operation time chart showing a comparison between an operation of the vehicle when the engine output characteristics change control is performed during the reacceleration response mode and an operation of the vehicle when the engine output characteristics change control is not performed. As shown in FIG. 5, the engine 1 is in the reacceleration response mode between time t1 and t2 wherein the accelerator position APO is reduced at time t1 and then once again raised starting from time t2. The transmission controller 8 is configured to control the gear shift control characteristics so that a low gear ratio will tend to be selected in step S5 or S7 in FIG. 2 as explained above to achieve a good responsiveness during reacceleration.

Since the low gear ratio is selected during the reacceleration response mode, the engine rotational speed is increased. Also, the accelerator position APO is in a reduced state during the reacceleration response mode. Therefore, in the normal operation mode without the engine output characteristics change control being performed, the engine controller 7 is configured to perform fuel cutoff, as shown in change over time in the air-fuel ratio indicated by the dash line in FIG. 5. Thus, the engine torque Te temporarily becomes negative torque, as shown by the dash line in FIG. 5. Then, once reacceleration is performed by increasing the accelerator position APO at time t2, the engine controller 7 is configured to switch the engine 1 from the fuel cutoff state to a fuel recovery state. Thus, the engine torque Te undergoes a change from negative torque to positive torque as shown in the dash line in FIG. 5.

Accordingly, the engine torque Te before and after reacceleration at time t2 becomes large. Thus, it is inevitable to avoid a delay in response that lasts until the engine torque Te changes from negative torque to the positive torque as the engine 1 changes from the fuel cutoff state to the fuel recovery state. Moreover, it is inevitable to eliminate dead time that lasts until the positive torque starts to be transmitted when the backlash, which is a gap between elements in the power transmission system, is inverted from the negative torque side to the positive torque side, as shown by the dash line in FIG. 5. Therefore, a period of time Δt2 becomes longer, which is measured from a reacceleration operation start time t2 to a time t4 at which a torque value corresponding with the accelerator position APO after the engine torque Te has actually increased is attained. Accordingly, even when the automatic transmission 2 is set to a low gear ratio in accordance with the reacceleration response mode, a problem arises in that the delay in responding to reacceleration will increase as shown in the dash line the vehicle speed VSP after the reacceleration start time t2 in FIG. 5.

In view of the above problem, the vehicle power train control apparatus of the first embodiment is configured to control the engine output characteristics by controlling the fuel cutoff apparatus in the reacceleration response mode during which the gear shift control characteristics is controlled by the transmission controller 8 in step S5 or S7 as explained above.

Figure 3:
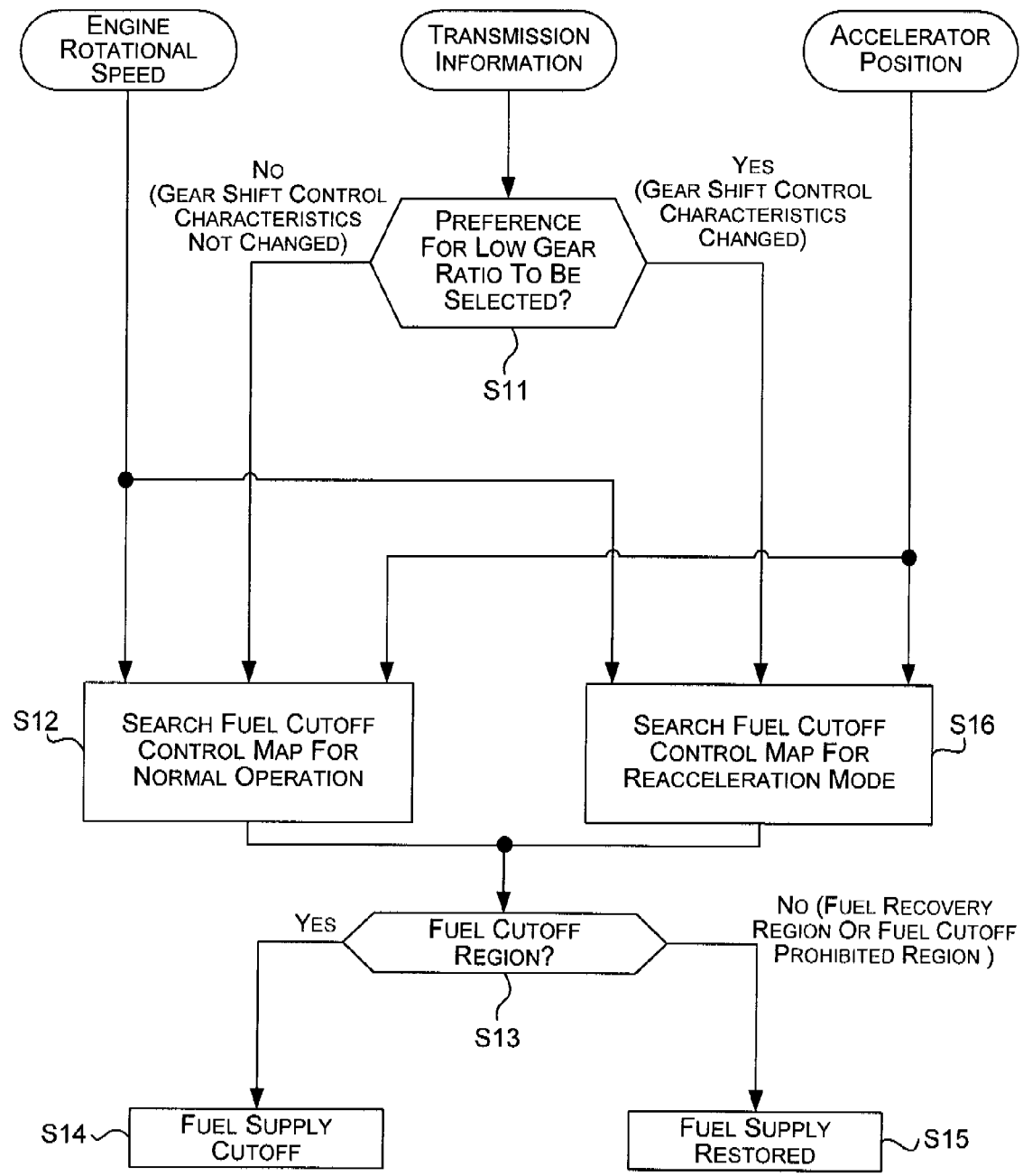
FIG. 3 is a flowchart illustrating an engine output characteristics control for a reacceleration response mode executed in the vehicle power train control apparatus as a part of the control process illustrated in FIG. 2 in accordance with the first embodiment of the present invention.

The engine controller 7 is configured to perform the engine output characteristics change control in accordance with the flowchart as shown in FIG. 3.

First, in step S11, the engine controller 7 is configured to determine based on transmission information from the transmission controller 8 whether a change is being made to the transmission control characteristics (a low gear ratio is likely to be selected) in step S7 (maintaining the low gear ratio) or step S5 (shifting to a low gear ratio) as shown in FIG. 2.

If the engine controller 7 determines that the gear shift control characteristics has not been changed in step S11 (No in step S11) (i.e., when the driving operation mode is in the fuel economy mode (step S2) or when the operation mode is in the reacceleration response mode and a change does not need to be made to the gear shift control characteristics (No in steps S4 and S6)), then the engine controller 7 is configured to determine whether the operation condition of the engine 1 is within the fuel cutoff region in step S12. More specifically, in step S12, the engine controller 7 is configured to refer to a fuel cutoff control map for a normal operation mode as shown in a diagram (a) of FIG. 4 based on the engine rotational speed Ne and the accelerator position APO detected by the engine rotation sensor 12 and the accelerator position sensor 11, respectively.

Figure 4:
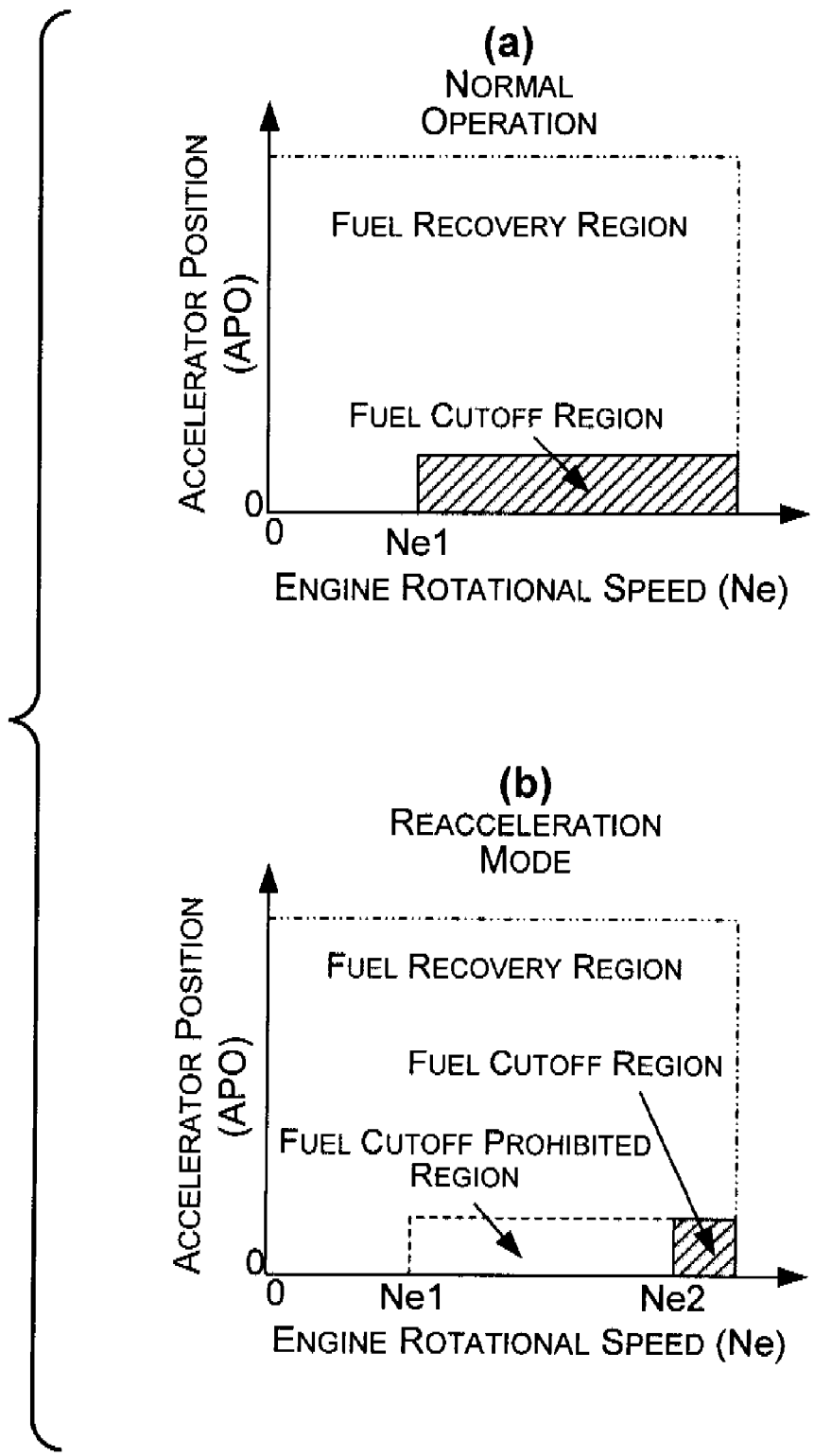
FIG. 4 is a pair of diagrams (a) and (b) illustrating fuel cutoff control maps used to change the engine output characteristics wherein the diagram (a) illustrates the fuel cutoff control map showing a fuel cutoff region for a normal operation mode and the diagram (b) illustrates the fuel cutoff control map showing a fuel cutoff region and a fuel cutoff prohibited region for the reacceleration response mode in accordance with the first embodiment of the present invention.

As shown in the diagram (a) of FIG. 4, the fuel cutoff region under the normal operation condition (normal operation mode) is a region for which the accelerator position APO is almost completely closed and a prescribed fuel recovery rotational speed Ne1 has been exceeded.

Thus, according to the fuel cutoff control map as shown in the diagram (a) of FIG. 4 (the normal operation mode), when the accelerator position APO is reduced to an almost completely closed state and the engine rotational speed Ne exceeds the fuel recovery rotational speed Ne1, the engine controller 7 is configured to close the fuel injection valves 5 and fuel is no longer injected into the engine 1, whereby the supply of fuel is cut off. If the engine rotational speed Ne decreases below the fuel recovery rotational speed Ne1, the engine controller 7 is configured to open the fuel injection valves 5 in order to prevent the engine 1 from stalling even when the accelerator position APO is reduced to an almost completely closed state. Thus, in that case, fuel is once again injected into the engine 1, whereby the supply of fuel is recovered.

In step S13, the engine controller 7 is configured to determine whether the search result in step S12 indicates that the vehicle is operating within the fuel cutoff region shown in the diagram (a) of FIG. 4. If the engine controller 7 determines that the vehicle is operating within the fuel cutoff region, then the engine controller 7 is configured to cut off the supply of fuel to the engine 1 in step S14. If the engine controller 7 determines that the vehicle is operating within the fuel recovery region in the diagram (a) of FIG. 4, then the engine controller 7 is configured to restore the supply of fuel to the engine 1 in step S15.

On the other hand, when the engine controller 7 determines in step S11 in FIG. 3 that the gear shift control characteristics has been changed (a low gear ratio is likely to be selected) (Yes in step S11) (i.e., when the driving operation mode is in the reacceleration response mode (step S2) and the gear shift control characteristics has been changed in step S5 or S7 in FIG. 2), the engine controller 7 is configured to determine whether the operation condition of the engine 1 is within the fuel cutoff region in step S16. More specifically, the engine controller 7 is configured to refer to a fuel cutoff control map for the reacceleration response mode shown in a diagram (b) of FIG. 4 based on the engine rotational speed Ne and the accelerator position APO detected by the engine rotation sensor 12 and the accelerator position sensor 11, respectively.

As shown in the diagram (b) of FIG. 4, the fuel cutoff control map for the reacceleration response mode includes a fuel cutoff prohibited region within a region corresponding to the fuel cutoff region in the fuel cutoff control map for the normal operation mode (the diagram (a) of FIG. 4). More specifically, in the fuel cutoff control map for the reacceleration response mode, the fuel cutoff region is set in a high rotational speed region where the engine rotational speed Ne is equal to or greater than a prescribed fuel cutoff rotational speed Ne2 (Ne≧Ne2).

Thus, according to the fuel cutoff control map as shown in the diagram (b) of FIG. 4 (the reacceleration response mode), when the accelerator position APO is reduced to an almost completely closed state and the engine rotational speed Ne exceeds the fuel cutoff rotational speed Ne2, which is a relatively high rotational speed, the engine controller 7 is configured to close the fuel injection valves 5 and fuel is no longer injected into the engine 1, whereby the supply of fuel is cut off. If the engine rotational speed Ne is smaller than the fuel cutoff rotational speed Ne2, the engine controller 7 is configured to open the fuel injection valves 5 in order to achieve the effects of the invention as explained below even when the accelerator position APO is reduced to an almost completely closed state. Thus, in that case, fuel is once again injected into the engine 1, whereby the supply of fuel is recovered.

In step S13, the engine controller 7 is configured to determine whether the search result in step S16 indicates that the vehicle is operating within the fuel cutoff region shown in the diagram (b) of FIG. 4. If the engine controller 7 determines that the vehicle is operating within the fuel cutoff region, then the engine controller 7 is configured to cut off the supply of fuel to the engine 1 in step S14. If the engine controller 7 determines that the vehicle is operating within the fuel recovery region or the fuel cutoff prohibited region in the diagram (b) of FIG. 4, then the engine controller 7 is configured to restore the supply of fuel to the engine 1 in step S15.

In the vehicle power train control apparatus of the first embodiment, by performing the fuel cutoff control according to the fuel cutoff control map shown in the diagram (b) of FIG. 4 during the reacceleration response mode, the problem described above can be eliminated as shown in FIG. 5.

As explained above, FIG. 5 illustrates an operation time chart during the reacceleration response mode and when the accelerator position APO is reduced at the time t1 and then once again raised at time t2. In such case, the transmission controller 8 is configured to change the gear shift control characteristics based on step S5 or S7 of FIG. 2 (a low gear ratio is likely to be selected) even if the accelerator position APO is reduced at time t1 so that a good responsiveness can be achieved during reacceleration (after time t2).

In such case, the engine rotational speed is increased (e.g., Ne>Ne1) since the low gear ratio is selected. Moreover, the accelerator position APO is reduced during the reacceleration response mode. Under such condition, if the fuel cutoff control is executed in accordance with the normal operation mode as shown in the diagram (a) of FIG. 4, the supply of fuel is cut off. Thus, the air-fuel ratio decreases almost down to zero, the engine torque Te temporarily becomes negative torque, and the backlash turns to the negative torque side as shown in the dash lines in FIG. 5.

However, according to the first embodiment of the present invention, the engine controller 7 is configured to switch the engine output characteristics so that the fuel cutoff control is performed based on the fuel cutoff control map shown in the diagram (b) of FIG. 4 during the reacceleration response mode. Accordingly, the engine operation condition (e.g., the rotational speed Ne is smaller than the fuel cutoff rotational speed Ne) falls within the fuel cutoff prohibited region in the diagram (b) of FIG. 4, where fuel cutoff is prohibited. Thus, the engine controller 7 is configured to maintain supply of fuel into the engine 1 (i.e., the supply of fuel is not cut off) after the time t1 of FIG. 5 at which the accelerator position APO is reduced.

As a result, the air-fuel ratio does not decrease after the time t1 of FIG. 5 at which the accelerator position APO is reduced, but is instead maintained at the same level, as shown by the solid line in FIG. 5. Therefore, the engine torque Te remains at a positive level, as shown by the solid line. Moreover, the positive backlash, which is the gap between elements in the power transmission system, is maintained as shown in the solid line in FIG. 5.

Therefore, the supply of fuel to the engine 1 is continued before and after reacceleration at time t2 upon the accelerator position APO being increased, and the engine torque Te is kept at a positive level before and after the time t2.

Accordingly, the difference in the engine torque Te before and after reacceleration at time t2 decreases. Moreover, it becomes possible to avoid the delay in a response that accompanies the change in direction of the engine torque Te (from negative torque to positive torque) because the positive torque is maintained before and after reacceleration at the time t2 as described above. Furthermore, the positive torque side backlash is maintained, as shown by the solid line in FIG. 5. Therefore, it becomes possible to avoid the dead time that accompanies the inversion of the backlash and that lasts until the torque starts to be transmitted.

These conditions allow a period of time Δt1 to be shorter than the period of time Δt2 of the comparison example. The period of time Δt1 is measured from the time t2, at which reacceleration starts, to the time t3, at which a torque value that corresponds to the accelerator position APO after the engine torque Te is actually increased is attained.

In addition, as described above, the automatic transmission 2 is configured to select a low gear ratio in accordance with the reacceleration response mode (step S5 or S7 of FIG. 2). Accordingly, the delay in response to reacceleration can be reduced as shown in the solid line in the vehicle speed VSP after the time t2 at which reacceleration starts in FIG. 5.

In this description of the first embodiment, the vehicle power train control apparatus is explained as controlling the gear control characteristics of the automatic transmission 2 in step S5 or S7 of FIG. 2 in addition to the engine output characteristics change control during the reacceleration response mode. However, conditions occur in which the rotational speed of the engine 1 increases to a high speed when the accelerator position APO is reduced even in a vehicle power train in which the gear shift control characteristics is not changed based on the driving operation mode. Therefore, it will be apparent to those skilled in the art from this disclosure of the present invention that the engine output characteristics change control for the reacceleration response mode as explained above can be performed even when the vehicle power train control apparatus is not configured to change the gear shift control characteristics of the automatic transmission according to the reacceleration response mode.

Second Embodiment

Figure 6:
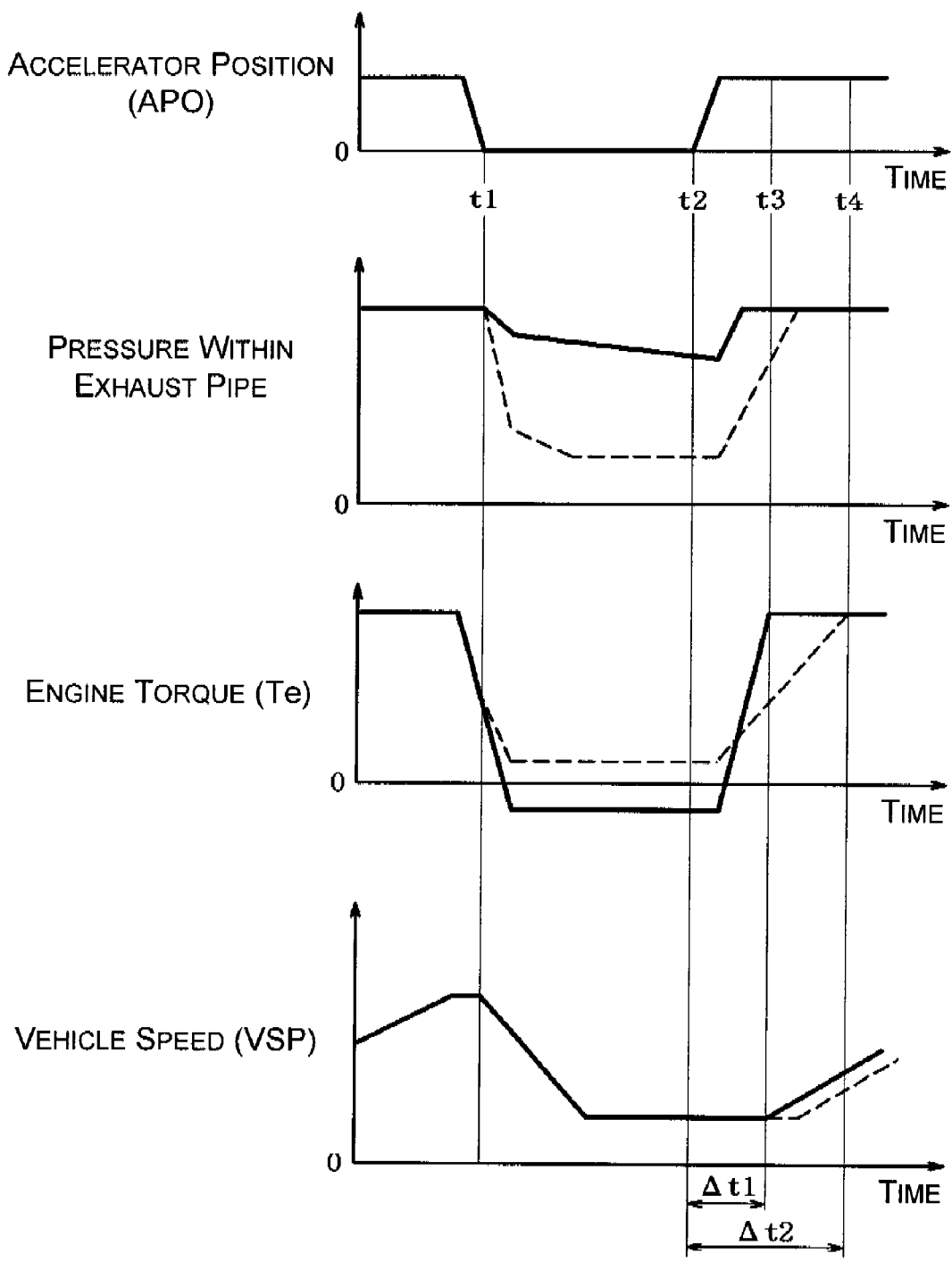
FIG. 6 is a simplified operation time chart showing a comparison between an operation of the vehicle when an engine output characteristics change control is performed in accordance with a second embodiment of the present invention and an operation of the vehicle when engine output characteristics change control is not performed.

Referring now to FIG. 6, a vehicle power train control apparatus in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The second embodiment of the present invention differs from the first embodiment in that the engine 1 is equipped with a combustion-type turbo supercharger installed in an exhaust pipe. More specifically, in the second embodiment, the engine 1 shown in FIG. 1 is preferably equipped with the combustion-type turbo supercharger as disclosed in, for example, Japanese Laid-Open Patent Application Publication No. 5-321804. The turbo supercharger is configured and arranged to force air into the engine 1 under supercharging condition using the energy of the engine exhaust gas. In order to eliminate a delay in the response to supercharging during reacceleration called "turbo-lag", the pressure in the exhaust pipe is increased by misfiring (which occurs when an unburned gaseous mixture of fuel and air is fed into the exhaust pipe and caused to combust) when the accelerator position is reduced before reacceleration to reduce pressure within the exhaust pipe of the engine 1. Thus, turbo supercharging promptly occurs during reacceleration. The turbo supercharger is a conventional component that is well known in the art. Since the turbo supercharger is well known in the art, the structure will not be discussed or illustrated in detail herein. Rather, it will be apparent to those skilled in the art from this disclosure that the component can be any type of structure and/or programming that can be used to carry out the present invention.

The engine 1 in the second embodiment is provided with such turbo supercharger installed in the exhaust pipe and the fuel cutoff apparatus as described in the first embodiment. With the engine 1, when only the gear shift control characteristics of the automatic transmission 2 is changed according to the driving operation mode, the following problem arises.

FIG. 6 is a simplified operation time chart showing a comparison between an operation of the vehicle when the engine output characteristics change control is performed in accordance with the second embodiment of the present invention and an operation of the vehicle when engine output characteristics change control is not performed. As shown in FIG. 6, the engine 1 is in the reacceleration response mode and the accelerator position APO is reduced at time t1 and then once again raised starting from time t2. In such case, as explained above, the transmission controller 8 is configured to change the gear shift control characteristics so that a low gear ratio is selected (step S5 or S7 in FIG. 2) even if the accelerator position APO is reduced at time t1 such that a good responsiveness during reacceleration can be achieved.

Since the low gear ratio is selected, the engine rotational speed Ne becomes high. Also, the accelerator position APO is reduced during the reacceleration response mode. Accordingly, if the fuel cutoff control is executed in accordance with the normal operation mode, the engine controller 7 is configured to cut off supply of fuel to the engine 1. Since the supply of fuel to the engine 1 is cut off, misfiring (in which the unburned gaseous mixture of fuel and air is fed into the exhaust pipe and caused to combust) does not occur, and thus, the pressure in the exhaust pipe decreases as shown by the dash line in FIG. 6. In other words, when only the gear shift control characteristics of the automatic transmission 2 is changed during the reacceleration response mode, and the engine output characteristics are not changed, the pressure in the exhaust pipe cannot be increased during the reacceleration response mode as shown by the dash line in FIG. 6.

Therefore, turbo supercharging by the turbo supercharger cannot promptly occur upon reacceleration at the time t2. Thus, the engine torque Te only gradually increases over time as indicated by the dash line in FIG. 6. As a result, a period of time Δt2 increases, which is a period of time between the reacceleration operation start time t2 and the time t4 at which a torque value corresponding with the accelerator position APO after the engine torque Te has actually increased is attained. Therefore, even when the automatic transmission 2 selects a low gear ratio in accordance with the reacceleration response mode, a problem arises in that the delay in responding to reacceleration will increase, as shown in the dash line in the vehicle speed VSP after the reacceleration start time t2.

Accordingly, in the second embodiment of the present invention, the engine controller 7 is configured to control the engine output characteristics of the engine 1 equipped with the fuel cutoff apparatus and the turbo supercharger during the reacceleration response mode in step S9 of FIG. 2.

The engine output characteristics change control in the second embodiment is basically the same as the engine output characteristics as illustrated in FIG. 3. More specifically, the engine controller 7 is configured to control the fuel cutoff based on the fuel cutoff control map for the normal operation shown in the diagram (a) of FIG. 4 if no change is made to the gear shift control characteristics based on step S5 or S7 of FIG. 2 (a low gear ratio is likely to be selected). On the other hand, the engine controller 7 is configured to control the fuel cutoff based on the fuel cutoff control map for the reacceleration response mode shown in the diagram (b) of FIG. 4 if a change is made to the gear shift control characteristics based on step S5 or S7 of FIG. 2 (a low gear ratio is likely to be selected).

By controlling the fuel cutoff based on the fuel cutoff control map shown in the diagram (b) of FIG. 4 during the reacceleration response mode in the second embodiment, the problem described above can be eliminated as shown in FIG. 6.

More specifically, as explained above, FIG. 6 illustrates a case in which the operation mode is in the reacceleration response mode, and the accelerator position APO is reduced at the time t1 and then once again raised at time t2 during the period in which changes are made to the gear shift control characteristics based on step S5 or S7 of FIG. 2 (a low gear ratio is likely to be selected). The transmission controller 8 is configured to change the gear shift control characteristics so that a low gear ratio is selected even if the accelerator position APO is reduced at time t1 to increase responsiveness during reacceleration (after time t2).

Since the low gear ratio is selected during the reacceleration response mode, the engine rotational speed Ne becomes high (e.g., Ne>Ne1). Moreover, during the reacceleration response mode, the accelerator position APO is reduced. However, if the engine controller 7 is configured to cut off supply of fuel to the engine 1 during the normal operation as shown in the diagram (a) of FIG. 4, the delay in responding to reacceleration will increase as explained above as shown in the dash line in the vehicle speed VSP after the reacceleration start time t2 in FIG. 6.

However, according to the second embodiment of the present invention, the engine controller 7 is configured to switch the engine output characteristics so that fuel cutoff control is performed based on the fuel cutoff control map shown in the diagram (b) of FIG. 4. Accordingly, when the operating condition is within the fuel cutoff prohibited region in the diagram (b) of FIG. 4, the engine controller 7 is configured to prevent fuel supply from being cut off. Thus, the supply of fuel is not cut off after the time t1 of FIG. 6 even if the accelerator position APO is reduced and the vehicle speed is relatively high (e.g., Ne>Ne1). As a result, since the supply of fuel to the engine 1 is not cut off, misfiring (in which the unburned gaseous mixture of fuel and air is fed into the exhaust pipe and caused to combust) can occur. Accordingly, the pressure in the exhaust pipe is prevented from decreasing even after the time t1 in FIG. 6 at which the accelerator position APO is reduced, as shown by the solid line. Therefore, turbo-supercharging can promptly occur at time t2 upon reacceleration being started, and the engine torque Te can be promptly increased, as shown by the solid line in FIG. 6.

These conditions allow a period of time Δt1 to be shorter than the period of time Δt2 of the comparison example. The period of time Δt1 is measured from the time t2, at which reacceleration starts, to the time t3, at which a torque value that corresponds to the accelerator position APO after the engine torque Te is actually increased is attained.

In addition, as described above, the automatic transmission 2 is configured to select a low gear ratio in accordance with the reacceleration response mode (step S5 or S7 of FIG. 2). Accordingly, the delay in response to reacceleration can be reduced, as shown in the change over time in the vehicle speed VSP after the time t2 at which reacceleration starts, as shown by the solid line in FIG. 6.

In this description of the second embodiment, the vehicle power train control apparatus is explained as controlling the gear control characteristics of the automatic transmission 2 in step S5 or S7 of FIG. 2 in addition to the engine output characteristics change control during the reacceleration response mode. However, conditions occur in which the rotational speed of the engine 1 increases to a high speed when the accelerator position APO is reduced even in a vehicle power train in which the gear shift control characteristics is not changed based on the driving operation mode. Therefore, it will be apparent to those skilled in the art from this disclosure of the present invention that the engine output characteristics change control for the reacceleration response mode as explained above can be performed even when the vehicle power train control apparatus is not configured to change the gear shift control characteristics of the automatic transmission according to the reacceleration response mode.

Third Embodiment

Figure 7:
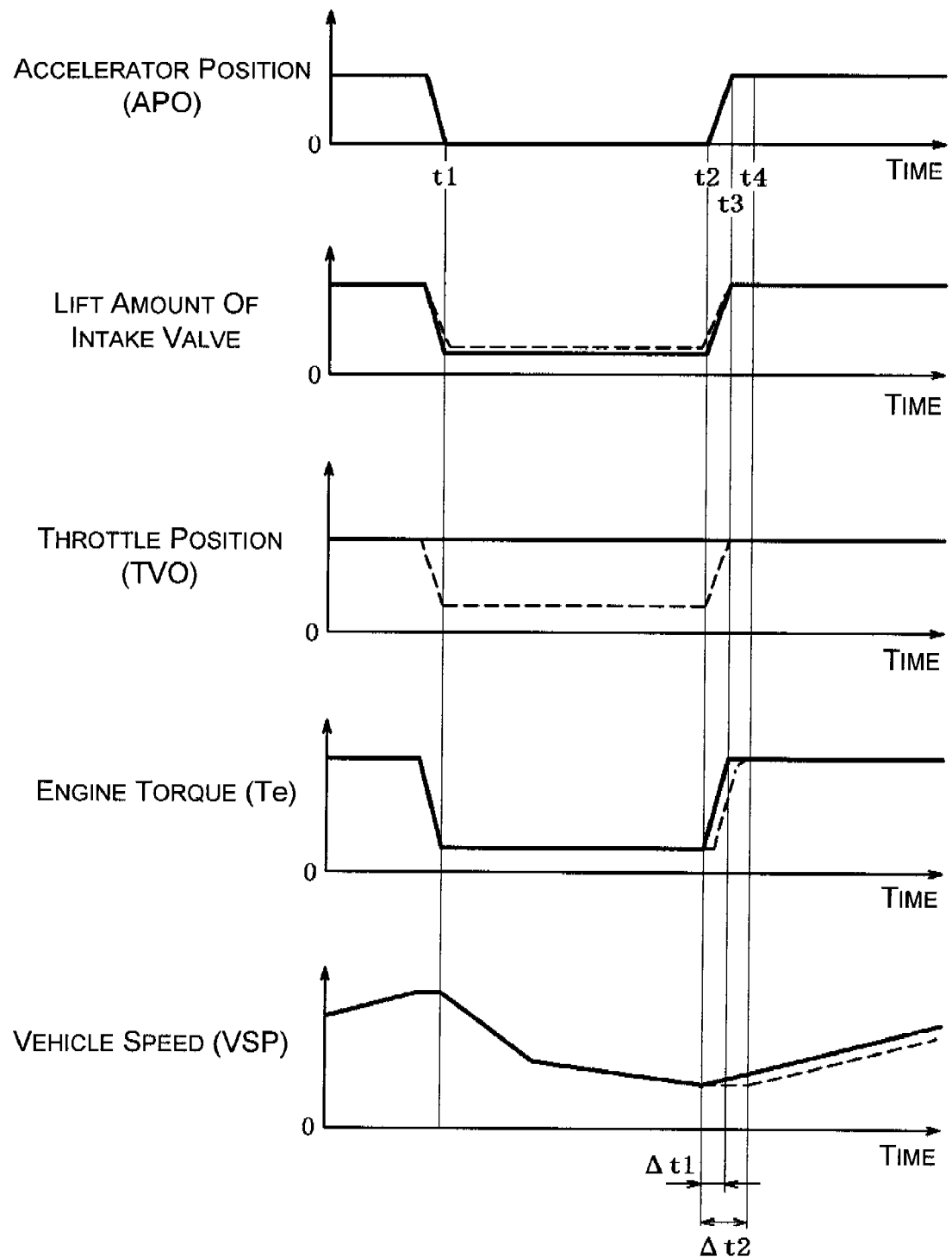
FIG. 7 is a simplified operation time chart showing a comparison between an operation of the vehicle when an engine output characteristics change control is performed in accordance with a third embodiment of the present invention and an operation of the vehicle when engine output characteristics change control is not performed.

Referring now to FIG. 7, a vehicle power train control apparatus in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The third embodiment of the present invention differs from the first embodiment in that the engine 1 is equipped with the variable valve mechanism 15 (FIG. 1) and the engine output characteristics change control for the reacceleration response mode in step S9 of FIG. 2 is executed by controlling a lift amount and opening/closing timing of at least one of an intake valve and an exhaust valve the engine 1.

More specifically, in the third embodiment, the engine 1 is preferably equipped with the variable valve mechanism 15 as disclosed in, for example, Japanese Laid-Open Patent Application Publication No. 2001-280167, When the engine 1 is equipped with the variable valve mechanism 15, the output of the engine 1 can be increased or decreased by controlling the throttle position of the throttle valve 4 of an intake system or by controlling the valve lift amount and opening/closing timing of intake and/or exhaust valves, thereby achieving good responsiveness. However, precision of the engine output control deteriorates when the accelerator position APO is low, including during idling. Therefore, the output of the engine 1 is controlled by additionally controlling the throttle position when the accelerator position APO is in a reduced state, and the output of the engine 1 is controlled by opening the throttle position and merely controlling the valve lift amount and opening/closing timing of the intake/exhaust valve when the accelerator position APO is not in the reduced state. The variable valve mechanism 15 is a conventional component that is well known in the art. Since the variable valve mechanism 15 is well known in the art, the structure will not be discussed or illustrated in detail herein. Rather, it will be apparent to those skilled in the art from this disclosure that the component can be any type of structure and/or programming that can be used to carry out the present invention.

Thus, the engine 1 in the third embodiment is provided with the variable valve mechanism 15 that is configured and arranged to control the engine output. With the engine 1, if the engine output characteristics are not changed according to the operation mode, the following problem arises.

FIG. 7 is a simplified operation time chart showing a comparison between an operation of the vehicle when the engine output characteristics change control is performed in accordance with the third embodiment of the present invention and an operation of the vehicle when engine output characteristics change control is not performed. FIG. 7 illustrates a case in which the accelerator position APO is reduced at the time t1 and once again increased starting from the time t2. In such case, the engine torque Te is increased and reduced by controlling the lift amount of the intake valve and controlling the throttle position TVO (shown by the dash line) in accordance with the reduced state of the accelerator position APO.

Therefore, the intake system of the engine 1 is constricted by the throttle position TVO during reacceleration at the time t2 upon the accelerator position APO being increased, and the throttle position TVO is opened at the time t3 due to the reacceleration of the vehicle as shown by the dash line in FIG. 7. Even if the engine output control is switched to the control performed solely by the variable valve mechanism 15, the increase in the engine torque Te is delayed by the delay in response and then starts to increase, as shown by the dash line in FIG. 7.

As a result, a period of time Δt2 increases, which is measured from the reacceleration operation start time t2 to the time t4 at which a torque value corresponding with the accelerator position APO after the engine torque Te has actually increased is attained. Thus, the delay in responding to reacceleration will increase as shown in the dash line in the vehicle speed VSP after the reacceleration start time t2 in FIG. 7.

In order to resolve the foregoing problem, the vehicle power train control apparatus of the third embodiment is configured and arranged to control the engine output characteristics for the reacceleration response mode in step S9 of FIG. 2 by controlling the variable valve mechanism 15. More specifically, in the third embodiment, the engine controller 7 is configured to control the engine output characteristics by controlling the throttle position and controlling the valve lift amount and opening/closing timing of the intake/exhaust valves based on a reduced accelerator position APO.

In the third embodiment, the engine output characteristics change control for the reacceleration response mode performed in step S9 of FIG. 2 is executed so that the engine output is determined solely by controlling the valve lift amount and opening/closing timing of the intake/exhaust valve, which has high response characteristics, instead of by controlling the throttle position, the valve lift amount, and the opening/closing timing of the intake/exhaust valve.

According to the engine output characteristics change control using only the variable valve mechanism 15, the foregoing problem can be eliminated as shown in FIG. 7.

As explained above, FIG. 7 illustrates a case in which the operation mode is in the reacceleration response mode, and the accelerator position APO is reduced at time t1 and then once again increased starting from time t2. As described above, during normal operation, the engine torque Te is increased and reduced by controlling the lift amount of the intake valve and controlling the throttle position TVO (shown by the dash line) in accordance with the accelerator position APO in a reduced state. Therefore, as explained above, the delay in responding to reacceleration will increase as indicated by the dash line in the vehicle speed VSP after the reacceleration start time t2 in FIG. 7.

However, in the third embodiment of the present invention, the engine controller 7 is configured to control the engine output characteristics during the reacceleration response mode so that the engine output control is performed merely by controlling the valve lift amount and the opening/closing timing of the intake/exhaust valve, which has a high response characteristics, even when the accelerator position APO is in a reduced state. Thus, the throttle position TVO remains unchanged as shown by the solid line even after the time t1 of FIG. 7 at which the accelerator position APO is reduced. As a result, the engine output is determined only by the amount of intake valve lift indicated by the solid line in FIG. 7.

Therefore, the engine intake system is not constricted by the throttle position TVO during reacceleration at time t2 upon the accelerator position APO being increased. Accordingly, it is possible to promptly start increasing the engine torque Te during reacceleration at the time t2 of FIG. 7, as shown by the solid line.

As a result, the period of time Δt1 is made shorter than the period of time Δt2 of the prior art. The period of time Δt1 is measured from the time t2, at which reacceleration starts, to the time t3, at which a torque value that corresponds to the accelerator position APO after the engine torque Te is actually increased is attained. The delay in response to reacceleration can be reduced as shown in the solid line in the vehicle speed VSP after the time t2 at which the reacceleration starts.

In this description of the third embodiment, the vehicle power train control apparatus is explained as controlling the gear control characteristics of the automatic transmission 2 in step S5 or S7 of FIG. 2 in addition to the engine output characteristics change control during the reacceleration response mode. However, it will be apparent to those skilled in the art from this disclosure of the present invention that the engine output characteristics change control of the variable valve mechanism 15 for the reacceleration response mode with a reduced acceleration position as explained above can be performed even when the vehicle power train control apparatus is not configured to change the gear shift control characteristics of the automatic transmission according to the reacceleration response mode.

Fourth Embodiment

Figure 8:
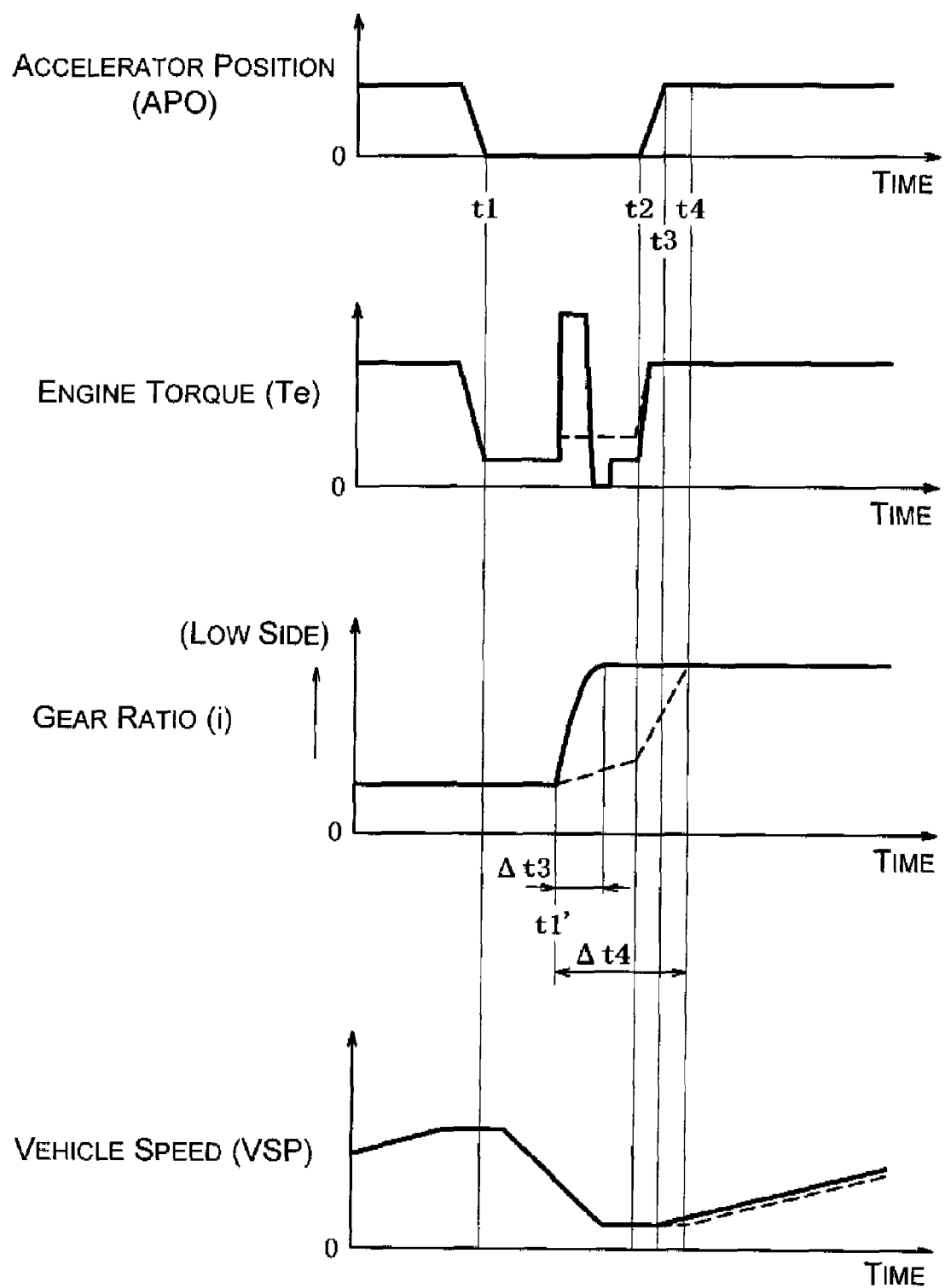
FIG. 8 is a simplified operation time chart showing a comparison between an operation of the vehicle when an engine output characteristics change control is performed in accordance with a fourth embodiment of the present invention and an operation of the vehicle when engine output characteristics change control is not performed.

Referring now to FIG. 8, a vehicle power train control apparatus in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The fourth embodiment of the present invention differs from the first embodiment in that the engine 1 is configured and arranged such that an engine torque is controlled in synchronization with rotation during gear shifting of the automatic transmission 2. Thus, in the fourth embodiment of the present invention, the engine output characteristics change control for the reacceleration response mode in step S9 of FIG. 2 is executed by controlling the engine output in synchronization with rotation during gear shifting of the automatic transmission 2.

As disclosed in Japanese Laid-Open Patent Application Publication No. 10-281276, the engine torque is controlled in synchronization with rotation during gear shifting to temporarily increase and reduce the engine torque that is synchronized with the post-shifting rotational speed in a prescribed response to the engine rotational speed. This action is performed in order to optimally balance the tradeoff between the need to alleviate shift shock and the need for the gears to be shifted as quickly as possible when gears are shifted in the automatic transmission 2.

In the engine 1 of the fourth embodiment is configured and arranged such that the engine torque is controlled in synchronization with rotation during gear shifting. Moreover, as described above, the transmission controller 8 is configured to control the gear shift control characteristics in accordance with the driving operation mode (step S5 or S7 in FIG. 2). When only the gear shift control characteristics is changed according to the operation mode, and the engine output characteristics are not changed with the engine 1 in which the engine torque is controlled in synchronization with rotation during gear shifting, the following problem arises.

FIG. 8 is a simplified operation time chart showing a comparison between an operation of the vehicle when the engine output characteristics change control is performed in accordance with the fourth embodiment of the present invention and an operation of the vehicle when engine output characteristics change control is not performed. FIG. 8 illustrates a case in which the operation mode is in the reacceleration response mode, and the accelerator position APO is reduced at time t1 and then once again raised starting from time t2. In such case, as explained above, the transmission controller 8 is configured to change the gear shift control characteristics so that a low gear ratio is selected (step S5 or S7 in FIG. 2) even if the accelerator position APO is reduced at time t1 focusing on responsiveness during reacceleration.

In the normal operation, when the gears are shifted to a low gear ratio side, the engine torque Te is temporarily increased as shown by the dash line in FIG. 8, and the engine rotational speed is also increased so that the gear ratio i will reach a post-shifting ratio at the time t4 based on a prescribed response, as shown by the dash line in FIG. 8. This control is performed in order to optimally balance the tradeoff between the needs relating to shift shock and gear shift response.

However, with the engine torque Te increasing as shown by the dash line, the gear ratio i reaches the post-shifting ratio slowly, as shown by the dash line in FIG. 8. Thus, the period of time Δt4, which is measured from the time t1' (start of gear shifting) to the time t4 (end of gear shifting) increases accordingly.

Therefore, in the reacceleration response mode, in which there is a decrease in the span from time t1 (where the accelerator position APO is reduced) to time t2 (where reacceleration occurs), such as on a continuously-winding road, a need for greater driving force arises from the increase in the accelerator position APO at time t3, which precedes the time t4 at which reacceleration downshifting ends. The driving force will not fulfill the associated need if the engine output characteristics are not changed in accordance with the driving operation mode.

In other words, even if the automatic transmission 2 uses a low gear ratio in response to the reacceleration response mode, the increase in driving force required for reacceleration will not be generated in time. Thus, delay in response to the reacceleration increases as shown in the dash line in the vehicle speed VSP in FIG. 8.

Accordingly, in the vehicle power train control apparatus of the fourth embodiment, the engine output characteristics change control is performed during the reacceleration response mode in step S9 of FIG. 2.

More specifically, in the fourth embodiment, the engine controller 7 is configured to change the engine output characteristics so that a torque-increasing control for use in rotation-synchronization during downshifting is used when control is performed for changing gear shift control characteristics (shifting to a low gear ratio) with regard to the automatic transmission 2 according to step S5 of FIG. 2. With the torque-increasing control in the fourth embodiment, the degree to which the engine torque is increased in order to raise the engine rotational speed to the post-downshift engine rotational speed is greater than when changes to the gear shift control characteristics (shifting to a low gear ratio) are not controlled.

According to the engine output characteristics change control of the fourth embodiment, the problem described above can be eliminated as shown in FIG. 8.

As explained above, FIG. 8 illustrates a case in which the operation mode is in the reacceleration response mode, and the accelerator position APO is reduced at the time t1 and then once again raised at time t2. The transmission controller 8 is configured to control the gear shift control characteristics in step S5 of FIG. 2 (a low gear ratio is likely to be selected) so that a low gear ratio is selected even if the accelerator position APO is reduced at time t1 in order to increase responsiveness during reacceleration after the time t2. Therefore, the desired downshifting to a low gear ratio occurs at time t1'.

Under normal engine operating circumstances during downshifting, the engine torque Te will be temporarily increased, as shown by the dash line in FIG. 8, and the engine rotational speed will be increased so that the gear ratio i will reach a post-shifting ratio at the time t4 based on a prescribed response, as shown by the dash line. This control is performed in order to optimally balance the tradeoff between the needs relating to shift shock and gear-shift response. However, as explained above, delay in response to the reacceleration increases as shown in the dash line in the vehicle speed VSP in FIG. 8.

Accordingly, with the fourth embodiment of the present invention, the engine output characteristics are controlled such that the amount that the engine torque is increased for rotation-synchronization when the accelerator position APO has been reduced, which lasts until the accelerator position APO is increased, is greater than the amount during normal operation. Therefore, the post-increase engine torque Te will be controlled as shown by the solid line in FIG. 8, which is greater than that indicated by the dash line (normal operation). Therefore, the gear ratio i promptly changes to the post-shifting gear ratio during the short period of time Δt3 from the time t1' at which downshifting starts, as shown by the change over time indicated by the solid line in FIG. 8.

As a result, even in the reacceleration response mode, in which there is a decrease in the span from time t1 (at which the accelerator position APO is reduced) to time t2 (at which reacceleration occurs), such as on a continuously-winding road, the downshift for reacceleration can be completed before the time t3 where a demand for an increase in driving force arises due to the accelerator position APO being increased. Therefore, driving force will be sufficient to meet the demand for an increased driving force created by the increase in the accelerator position APO.

Accordingly, when the demand arises for an increase in driving force in conjunction with reacceleration, the downshifting of the automatic transmission 2 for reacceleration can be reliably completed. It is possible to avoid problems presented by increased delay in response to reacceleration due to the downshifting as shown in the solid line in the vehicle speed VSP in FIG. 8.

In the illustrated embodiments, the driving operation mode is determined based on the information relating to the vehicle operation such as the vehicle speed VSP, the accelerator position APO, the brake operation state, the lateral acceleration Gy and the like. However, the present invention is not limited to this arrangement, and the driving operation mode can be determined in various different ways. For example, the driving operation mode may be determined based on the navigational (GPS) information such that the transmission controller 8 or the engine controller 7 is configured to determine that the driving operation mode is in the reacceleration response mode when the navigational information indicates that the vehicle is traveling on a rode that requires reacceleration of the vehicle (e.g., a continuously winding road or a rode with slopes).

Accordingly, in the vehicle power train control apparatus according to the present invention the engine output characteristics are changed during the reacceleration response mode under a reduced accelerator position state until the accelerator position is increased so that driving force will increase upon reacceleration after the vehicle has decelerated. Therefore, the driving force during the period in which the accelerator pedal 10 is once again pressed down during the reacceleration is increased, and the responsiveness during the reacceleration after the vehicle has decelerated can be increased.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle power train control apparatus comprising:
an output characteristics changing section configured and arranged to change engine output characteristics of a vehicle with respect to an operation of an accelerator pedal;
an operation mode determining section configured to determine an operation mode of the vehicle among a plurality of operation modes including at least a reacceleration response mode based on driving information of the vehicle; and
a control section configured to control the output characteristics changing section to change the engine output characteristics under a reduced accelerator position state during the reacceleration response mode to increase a driving force upon reacceleration of the vehicle when an accelerator position is increased after the vehicle was decelerated.

2. The vehicle power train control apparatus as recited in claim 1, further comprising
a gear shift control characteristics changing section configured to change gear shift control characteristics of an automatic transmission of the vehicle when the operation mode of the vehicle is in the reacceleration response mode,
the control section being further configured to change the engine output characteristics when the gear shift control characteristics changing section changes the gear shift control characteristics during the reacceleration response mode.

3. The vehicle power train control apparatus as recited in claim 1, wherein
the output characteristics changing section is configured to selectively perform a fuel cutoff operation in which fuel supply to the engine is stopped,
the control section is further configured to prohibit the fuel cutoff operation under the reduced accelerator position state during the reacceleration response mode.

4. The vehicle power train control apparatus as recited in claim 1, wherein
the output characteristics changing section is configured to selectively control a variable valve mechanism of an engine to change an output of the engine by controlling a lift amount and an opening/closing timing of at least one of an intake valve and an exhaust valve of the engine, and
the control section is further configured to control the output of the engine by controlling the lift amount and the opening/closing timing of the at least one of the intake valve and the exhaust valve while a throttle position is maintained opened under the reduced accelerator position state during the reacceleration response mode.

5. The vehicle power train control apparatus as recited in claim 2, wherein
the gear shift control characteristics changing section is further configured to change the gear shift control characteristics such that a low gear ratio characteristic is selected under the reduced accelerator position state during the reacceleration response mode, and
the control section is further configured to increase an engine torque so that an engine rotational speed is increased to a target engine rotational speed after downshifting of the automatic transmission is completed, the control section being further configured to set an increase amount of the engine torque during the reacceleration response mode to be greater than an increase amount of the engine torque during an operation mode that is not the reacceleration response mode.

6. The vehicle power train control apparatus as recited in claim 1, wherein
the operation mode determining section is configured to determine that the operation mode is in the reacceleration response mode when an operation amount of at least one of the accelerator pedal and a brake pedal is equal to or greater than a predetermined amount and a speed at which the vehicle passes a curve in a road is equal to or greater than a predetermined speed within a predetermined period of traveling.

7. The vehicle power train control apparatus as recited in claim 2, wherein
the gear shift control characteristics changing section is configured to change the gear shift control characteristics of the automatic transmission such that a lower gear ratio is selected during the reacceleration response mode when a vehicle deceleration rate is equal to or greater than a prescribed value.

8. The vehicle power train control apparatus as recited in claim 2, wherein
the gear shift control characteristics changing section is configured to change the gear shift control characteristics of the automatic transmission such that a low gear ratio characteristic is selected at least one of when the vehicle is travelling on a curve in a road and when a rate at which the accelerator position is reduced is equal to or greater than a prescribed rate during the reacceleration response mode.

9. A vehicle power train control apparatus comprising:

output characteristics changing means for changing engine output characteristics of a vehicle with respect to an operation of an accelerator pedal;

operation mode determining means for determining an operation mode of the vehicle among a plurality of operation modes including at least a reacceleration response mode based on driving information of the vehicle; and control means for controlling the output characteristics changing means to change the engine output characteristics under a reduced accelerator position state during the reacceleration response mode to increase a driving force upon reacceleration of the vehicle when an accelerator position is increased after the vehicle was decelerated.

10. A vehicle power train control method comprising:

determining an operation mode of the vehicle among a plurality of operation modes including at least a reacceleration response mode based on driving information of the vehicle; and changing engine output characteristics with respect to an operation of an accelerator pedal under a reduced accelerator position state during the reacceleration response mode to increase a driving force upon reacceleration of the vehicle when an accelerator position is increased after the vehicle was decelerated.

* * * * *